United States Patent
Snyder et al.

(10) Patent No.: US 10,693,300 B2
(45) Date of Patent: Jun. 23, 2020

(54) STEPWISE BATTERY MODULE PRECHARGE AND POST-DISCHARGE OF HIGH VOLTAGE BATTERY SYSTEMS

(71) Applicant: SAFT AMERICA, INC., Cockeysville, MD (US)

(72) Inventors: James Snyder, Hanover, PA (US); Keith Hensley, Baltimore, MD (US)

(73) Assignee: SAFT AMERICA, Cockeysville, MD (US)

( * ) Notice: Subject to any disclaimer, the term of this patent is extended or adjusted under 35 U.S.C. 154(b) by 372 days.

(21) Appl. No.: 15/856,847

(22) Filed: Dec. 28, 2017

(65) Prior Publication Data

US 2019/0207395 A1    Jul. 4, 2019

(51) Int. Cl.
*H02J 7/00* (2006.01)
*H02J 7/34* (2006.01)

(52) U.S. Cl.
CPC .......... *H02J 7/0016* (2013.01); *H02J 7/0021* (2013.01); *H02J 7/0024* (2013.01); *H02J 7/0063* (2013.01); *H02J 7/345* (2013.01); *H02J 2007/0067* (2013.01)

(58) Field of Classification Search
CPC ...... H02J 7/0016; H02J 7/0063; H02J 7/0021; H02J 7/0024; H02J 7/345; H02J 2007/0067
USPC .......................................................... 320/128
See application file for complete search history.

(56) References Cited

U.S. PATENT DOCUMENTS

| | | | |
|---|---|---|---|
| 7,489,048 B2 * | 2/2009 | King | H02J 7/0024 307/10.1 |
| 8,049,372 B2 * | 11/2011 | Newhouse | B60R 16/03 307/115 |
| 8,963,500 B2 * | 2/2015 | Rutkowski | H01M 2/1077 320/121 |
| 9,525,290 B2 | 12/2016 | Snyder | |
| 2017/0166075 A1 * | 6/2017 | Hong | B60L 58/12 |

* cited by examiner

*Primary Examiner* — M Baye Diao
(74) *Attorney, Agent, or Firm* — Sughrue Mion, PLLC

(57) ABSTRACT

A method may include activating two or more bypassable battery modules in succession through a current-limiting circuit to precharge an application bus from a power source.

20 Claims, 15 Drawing Sheets

STEPWISE BATTERY MODULE PRECHARGE AND POST-DISCHARGE OF HIGH VOLTAGE BATTERY SYSTEMS

FIELD

Apparatuses and methods consistent with example embodiments relate to a bypassable battery module system and a method for activating and bypassing bypassable battery modules, of the bypassable battery module system, in a stepwise manner to precharge and post-discharge an application bus.

BACKGROUND

Precharging refers to a mode of operation in a high voltage direct current (DC) application in which inrush current is limited during an initial power-up procedure of the application. A high voltage system with a large capacitive load can be exposed to a large amount of electric current during the initial power-up of the application. If unlimited, the electric current can cause considerable stress and damage to system components. Precharging attempts to mitigate deleterious effects by limiting the magnitude of the inrush current. Further, post-discharging refers to a mode of operation in which application bus voltage is discharged back into a power source during shutdown of an application. Post-discharging can further reduce deleterious effects associated with high capacitance applications.

SUMMARY

According to some possible implementations, a method may include activating a first bypassable battery module, of a bypassable battery module system, to precharge an application bus through a precharge circuit. A first voltage difference between a first output voltage of the bypassable battery module system and a first application bus voltage is less than a total voltage of the bypassable battery module system based on activating the first bypassable battery module of the bypassable battery module system. The method may include activating a second bypassable battery module, of the bypassable battery module system, to precharge the application bus through the precharge circuit based on activating the first bypassable battery module. A second voltage difference between a second output voltage of the bypassable battery module system and a second application bus voltage is less than the total voltage of the bypassable battery module system based on activating the second bypassable battery module.

According to some possible implementations, a system may include a first battery module configured to activate to precharge an application bus through a precharge circuit. A first voltage difference between a first output voltage of the system and a first application bus voltage is less than a total voltage of the system based on the first battery module being activated. The system may include a second battery module configured to activate to precharge the application bus through the precharge circuit after the first battery module is activated. A second voltage difference between a second output voltage of the system and a second application bus voltage is less than the total voltage of the system based on the second battery module being activated.

According to some possible implementations, a device may include one or more processors to activate a first bypassable battery module, of a bypassable battery module system, to precharge an application bus through a precharge circuit. A first voltage difference between a first output voltage of the bypassable battery module system and a first application bus voltage is less than a total voltage of the bypassable battery module system. The one or more processors may activate a second bypassable battery module, of the bypassable battery module system, to precharge the application bus through the precharge circuit based on activating the first bypassable battery module. A second voltage difference between a second output voltage of the bypassable battery module system and a second application bus voltage is less than the total voltage of the bypassable battery module system based on activating the second bypassable battery module.

DETAILED DESCRIPTION OF THE PREFERRED EMBODIMENTS

Figure 1A:
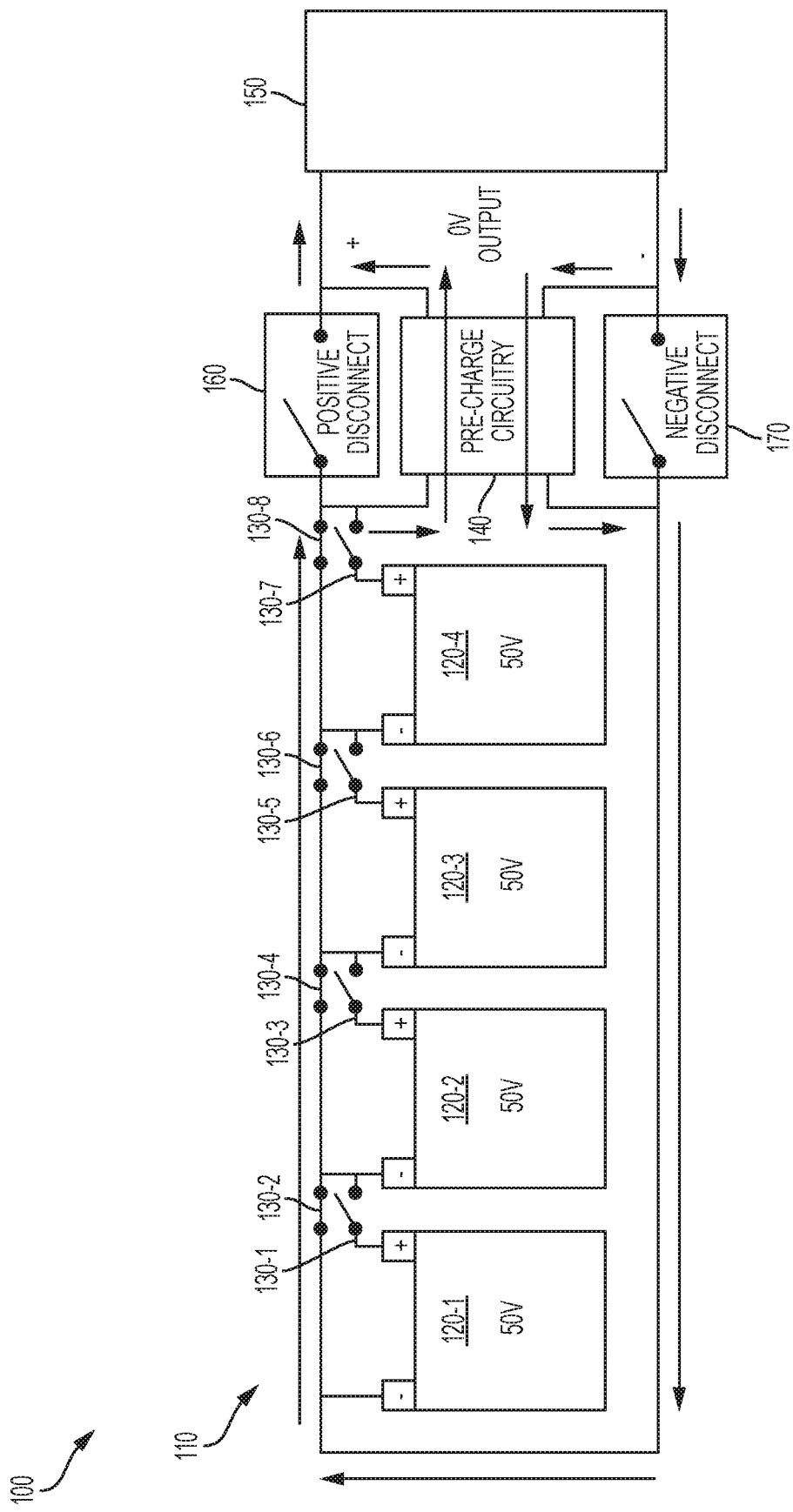
FIGS. 1A-1F are diagrams of an overview of an example implementation described herein.

The following detailed description of example implementations refers to the accompanying drawings. The same reference numbers in different drawings may identify the same or similar elements.

A high voltage (e.g., 1000 volts (V), 1200V, 1600V, etc.) power source and precharge circuitry can be used to precharge an application bus having a high capacitance (e.g., 10 milifarads (mF), 20 mF, 35 mF, etc.). In a situation where the high voltage power source is connected to the application bus through the precharge circuitry, a voltage difference between an output voltage of the high voltage power source and a voltage of the application bus may cause deleterious effects. For example, a large voltage difference (e.g., 1000V, 1200V, 1600V, etc.) may cause extensive ohmic heating as inrush current passes through the precharge circuitry based on the voltage difference. As a result, physically large precharge circuitry components and/or cooling components may be required to be implemented to dissipate heat generated during the precharge process. Similarly, the cost of the precharge circuitry is commensurately increased.

Some implementations described herein provide a bypassable battery module system that may activate bypassable battery modules, of the bypassable battery module system, in a stepwise manner to precharge an application bus. In this way, a voltage difference between the bypassable battery module system and the application bus is reduced as compared to situations where the entire voltage, of a power source, is introduced to the application bus substantially instantaneously. Thereby, some implementations described herein reduce an amount of current that passes through the precharge circuitry, reduce an amount of ohmic heating, reduce power loss, and/or the like, during the precharge process. In this way, some implementations described herein permit physically smaller precharge circuitry components to be used during the precharge process, reduce cost associated with such components, reduce a number of situations where components associated with the power source, precharge circuitry, and/or application bus are damaged or destroyed, and/or the like.

FIGS. 1A-1F are diagrams of an overview of an example implementation 100 described herein. Example implementation 100 may include a bypassable battery module system 110, a first bypassable battery module 120-1, a second bypassable battery module 120-2, a third bypassable battery module 120-3, a fourth bypassable battery module 120-4, a set of switches 130-1 through 130-8, a precharge circuit 140, an application bus 150, a positive disconnect 160, and a negative disconnect 170.

Bypassable battery module system 110 includes a component capable of selectively activating and/or bypassing bypassable battery modules 120-1 through 120-4 to permit stepwise precharge and/or post-discharge of application bus 150. Bypassable battery module system 110 includes a set of bypassable battery modules 120-1 through 120-4 connected in series that are each capable of being in an active state or a bypassed state.

In the active state, a voltage of bypassable battery module 120 may contribute to an output voltage of bypassable battery module system 110. In the bypassed state, a voltage of bypassable battery module 120 may not contribute to an output voltage of bypassable battery module system 110. In this way, bypassable battery module system 110 may adjust an output voltage of bypassable battery module system 110 based on the number of bypassable battery modules 120 that are in the active state.

Bypassable battery modules 120-1 through 120-4 include components capable of being selectively activated and/or bypassed to permit stepwise precharge and/or post-discharge of application bus 150. For example, each bypassable battery module 120-1 through 120-4 includes a 50V power source that may be selectively connected to application bus 150 by switches 130-1 through 130-8.

Switches 130-1 through 130-8 include components capable of selectively connecting battery modules 120-1 through 120-4 to application bus 150. For example, bypassable battery module system 110 may selectively control switches 130-1 through 130-8 to connect or disconnect bypassable battery modules 120, thereby adjusting an output voltage of bypassable battery module system 110.

Precharge circuit 140 includes a component capable of limiting an amount of current that passes between bypassable battery module system 110 and application bus 150. For example, precharge circuit 140 may include a resistive component configured to limit inrush current that passes between bypassable battery module system 110 and application bus 150.

Positive disconnect 160 and negative disconnect 170 include components capable of permitting or preventing current to pass between bypassable battery module system 110 and application bus 150. For example, positive disconnect 160 and/or negative disconnect 170 may include a switching component capable of being selectively switched to permit or prevent current from passing between bypassable battery module system 110 and application bus 150.

As shown in FIG. 1A, bypassable battery module system 110 may close precharge circuit 140 to permit current to pass from bypassable battery module system 110 to application bus 150 through precharge circuit 140. As further shown in FIG. 1A, each bypassable battery module 120 is in the bypassed state. For example, as shown in FIG. 1A, each respective switch 130 may be open, thereby preventing respective voltages of bypassable battery modules 120 from being connected to application bus 150. As such, an output voltage of bypassable battery module system 110 is 0V because each respective bypassable battery module 120 is being bypassed.

Figure 1B:
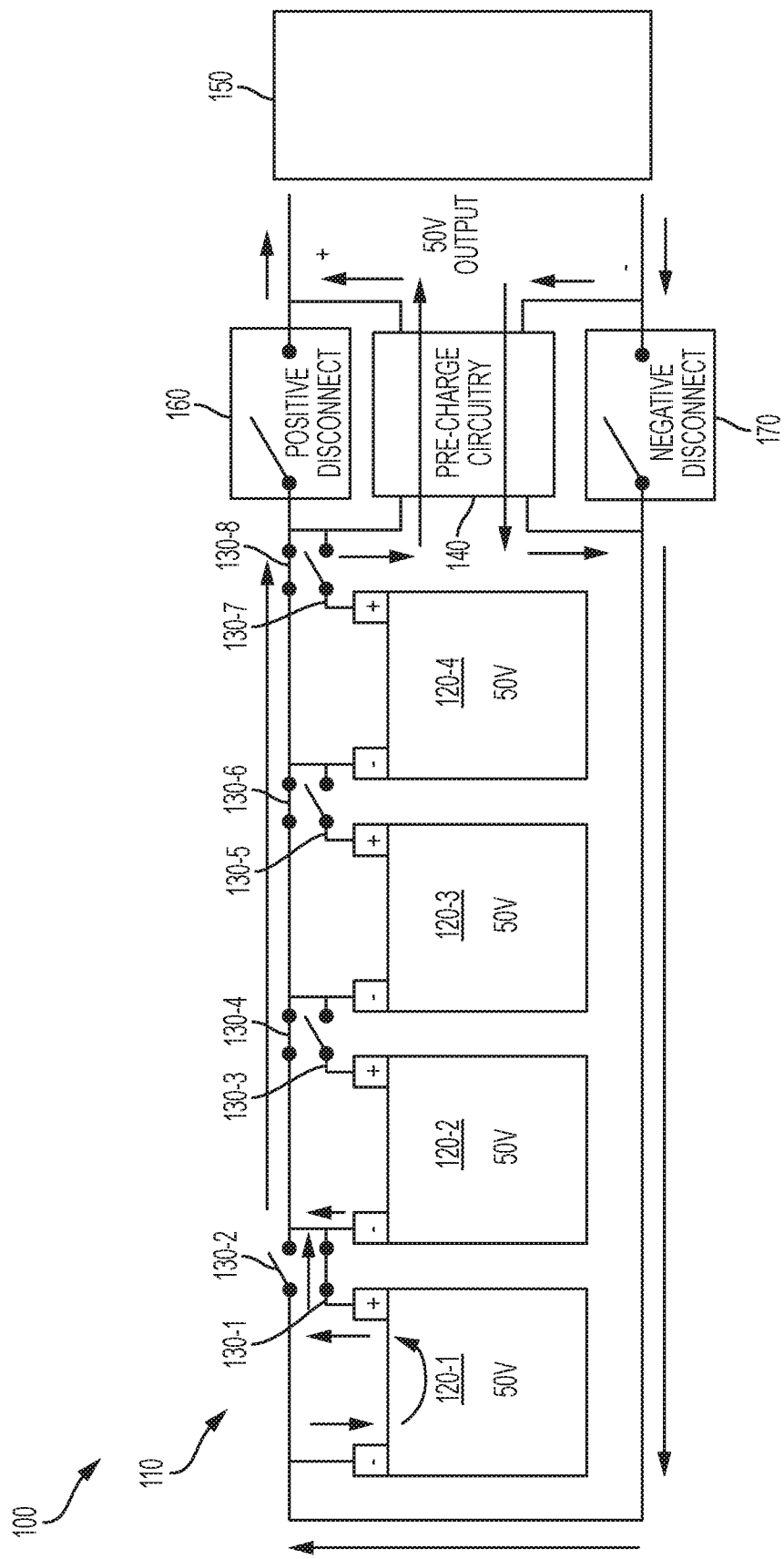

As shown in FIG. 1B, bypassable battery module system 110 may activate bypassable battery module 120-1 by closing switch 130-1 and opening switch 130-2, thereby causing the output voltage of bypassable battery module system 110 to increase by an amount equal to the voltage of bypassable battery module 120-1. In this case, the output voltage of bypassable battery module system 110 is 50V, and a voltage difference between the output voltage of bypassable battery module system 110 and a voltage of application bus 150 is 50V (e.g., 50V–0V=50V). The voltage difference may cause inrush current to pass through precharge circuit 140 into application bus 150, thereby permitting capacitive components of application bus 150 to be charged. As such, the voltage of application 150 bus may reach 50V based on bypassable battery module 120-1 being activated.

Figure 1C:
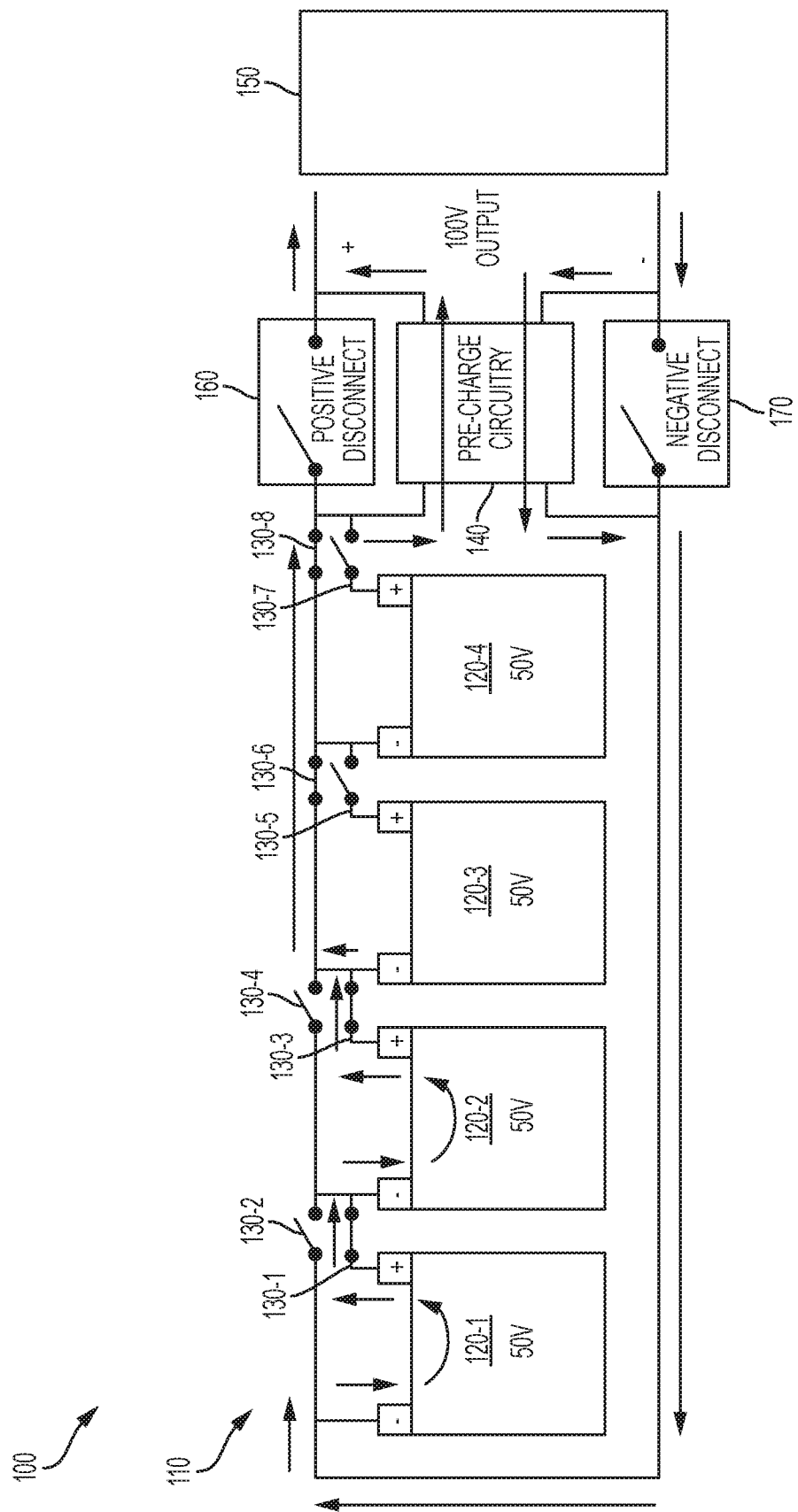

As shown in FIG. 1C, bypassable battery module system 110 may activate bypassable battery module 120-2 by closing switch 130-3 and opening switch 130-4, thereby causing the output voltage of bypassable battery module system 110 to increase by an amount equal to the voltage of bypassable battery module 120-2. In this case, the output voltage of bypassable battery module system 110 is 100V, and the voltage difference between the output voltage of bypassable battery module system 110 and the voltage of application bus 150 is 50V (e.g., 100V–50V=50V). As such, the voltage of application bus 150 may reach 100V based on bypassable battery modules 120-1 and 120-2 being activated.

Figure 1D:
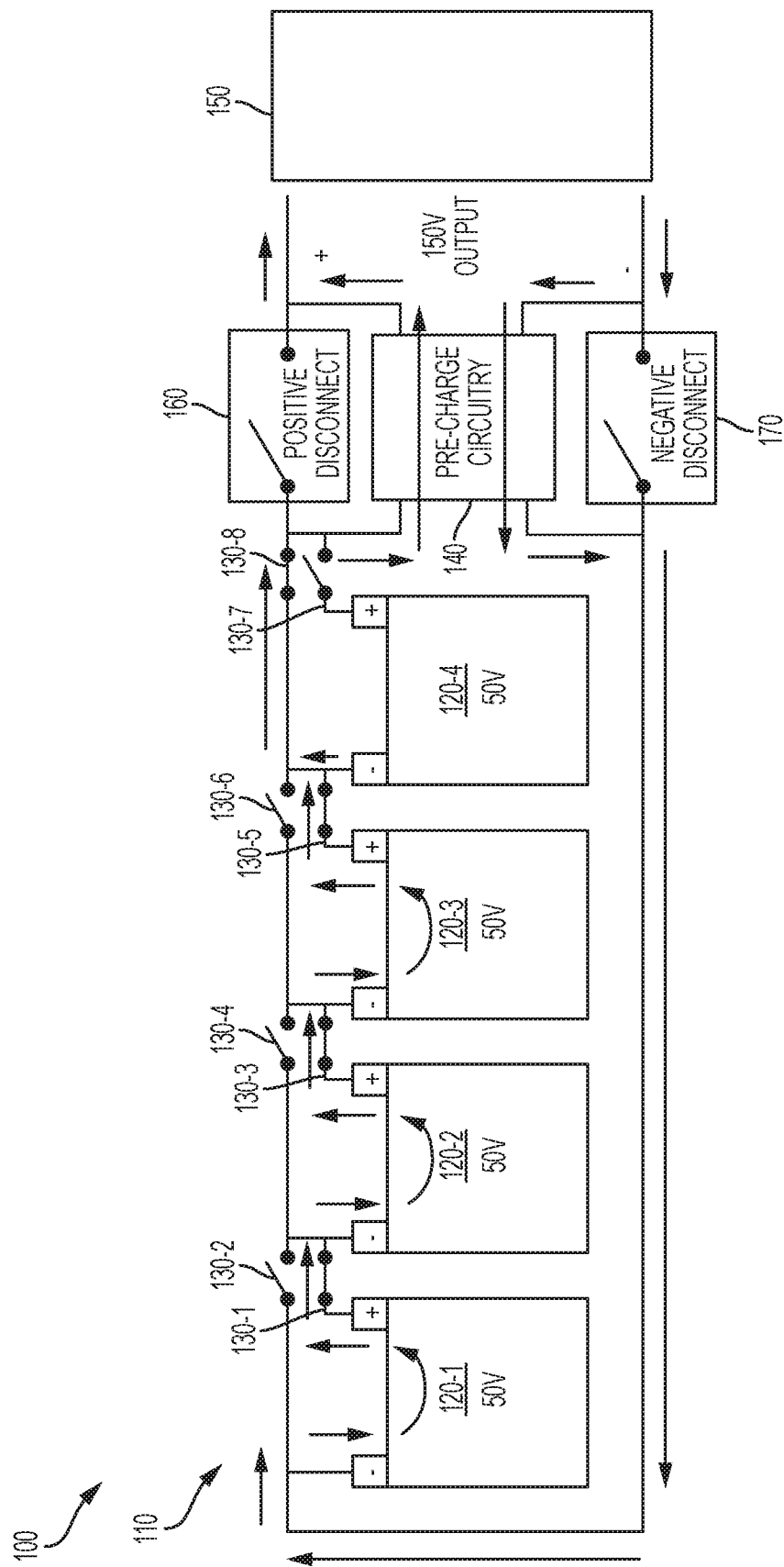

As shown in FIG. 1D, bypassable battery module system 110 may activate bypassable battery module 120-3 by closing switch 130-5 and opening switch 130-6, thereby causing the output voltage of bypassable battery module system 110 to increase by an amount equal to the voltage of bypassable battery module 120-3. In this case, the output voltage of bypassable battery module system 110 is 150V, and the voltage difference between the output voltage of bypassable battery module system 110 and the voltage of application bus 150 is 50V (e.g., 150V–100V=50V). As such, the voltage of application bus 150 may reach 150V based on bypassable battery modules 120-1 through 120-3 being activated.

Figure 1E:
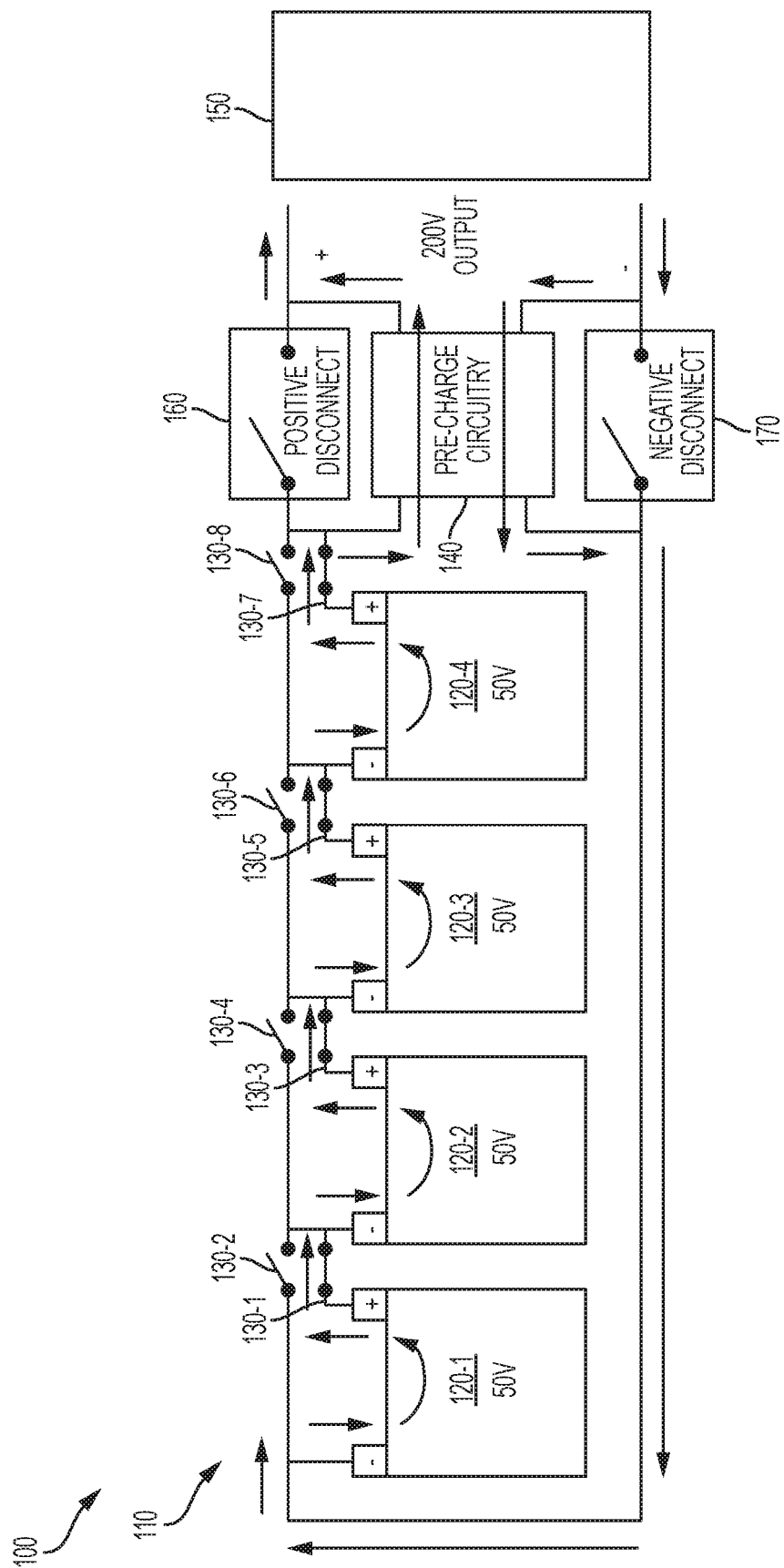

As shown in FIG. 1E, bypassable battery module system 110 may activate bypassable battery module 120-4 by closing switch 130-7 and opening switch 130-8, thereby causing an output voltage of bypassable battery module system 110 to increase by an amount equal to the voltage of bypassable battery module 120-4. In this case, the output voltage of bypassable battery module system 110 is 200V, and the voltage difference between the output voltage of bypassable battery module system 110 and the voltage of application bus 150 is 50V (e.g., 200V−150V=50V). As such, the voltage of application bus 150 may reach 200V based on bypassable battery modules 120-1 through 120-4 being activated.

Figure 1F:
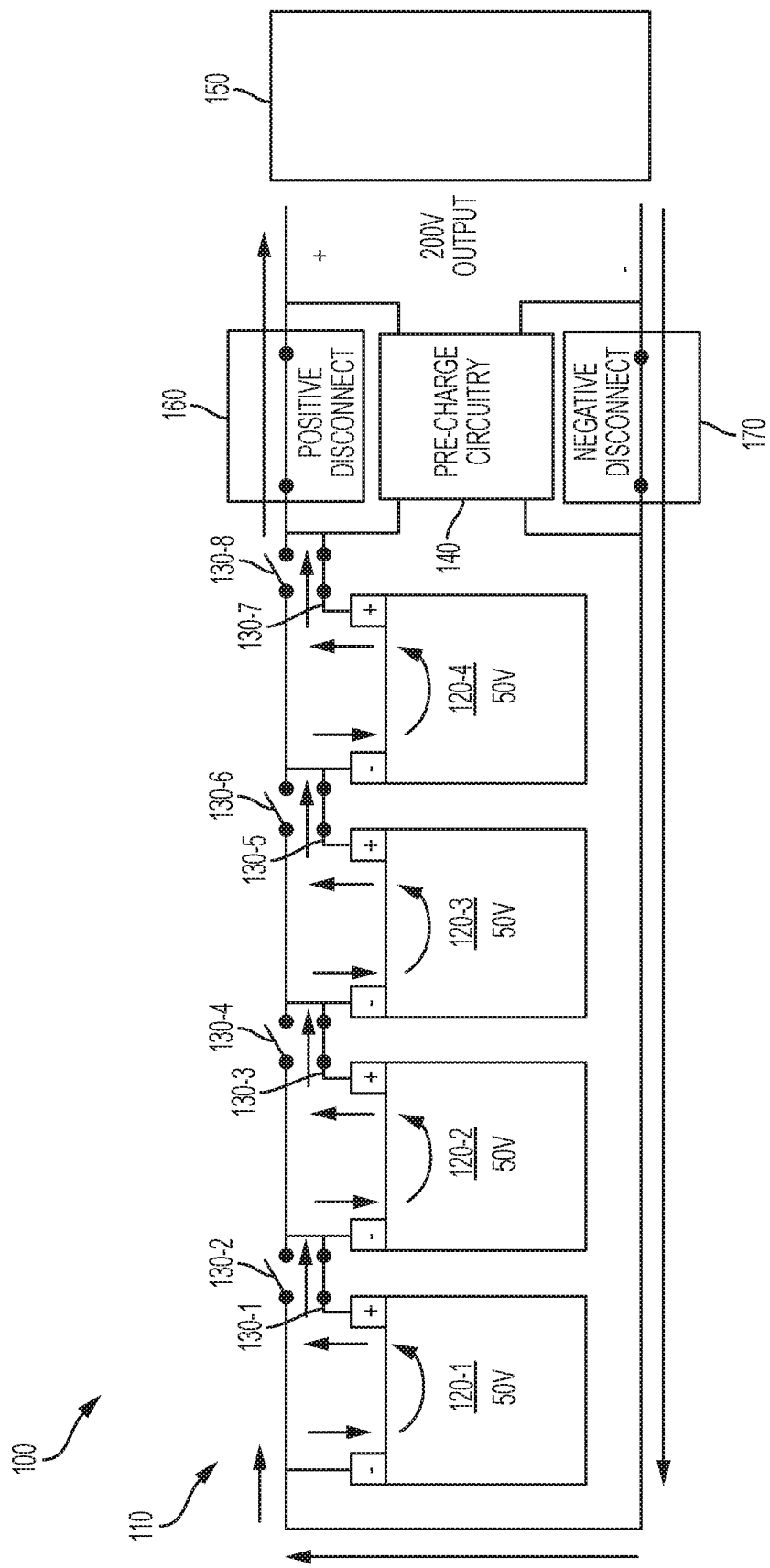

As shown in FIG. 1F, bypassable battery module system 110 may close positive disconnect 160 and negative disconnect 170 to permit current to pass between bypassable battery module system 110 and application bus 150 through positive disconnect 160 and negative disconnect 170.

While FIGS. 1A-1F include an example implementation 100, it should be understood that other implementations may be different than what is shown in FIGS. 1A-1F.

In this way, the bypassable battery module system may activate bypassable battery modules in a stepwise manner to permit precharging of the application bus. Additionally, the voltage of the application bus may increase to the output voltage of the bypassable battery module system. Still further, the voltage difference between the output voltage of the bypassable battery module system and the voltage of the application bus might not exceed an amount equal to the voltage of any particular bypassable battery module of the bypassable battery module system. As such, an amount of inrush current is reduced as compared to situations where a voltage difference between the output voltage of a power source and an application bus is substantially equal to the output voltage of the power source.

As such, some implementations described herein reduce an amount of power loss due to ohmic heating, permit a reduction in size of precharge circuitry, reduce a number of situations where damage to the system occurs, reduce a cost of the system, and/or the like.

Figure 2:
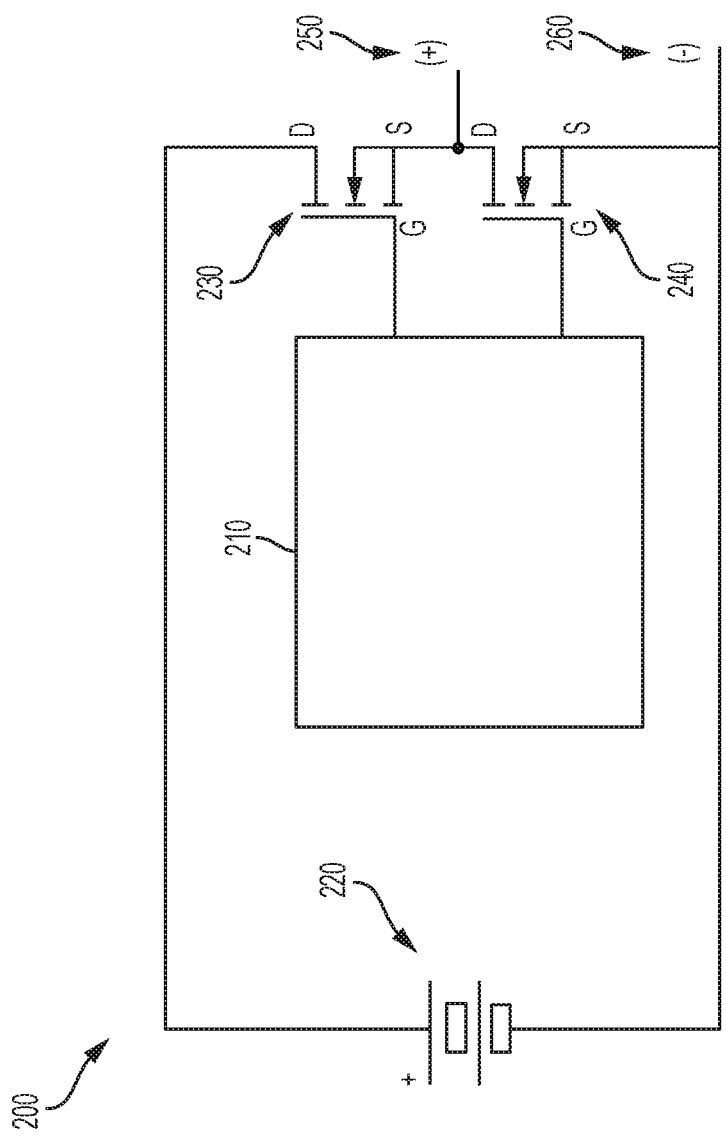
FIG. 2 is a diagram of an example bypassable battery module described herein.

FIG. 2 is a diagram of an example bypassable battery module 200 described herein. As shown in FIG. 2, bypassable battery module 200 may include a solid state driver 210, a cell stack array 220, a first solid state switch 230, a second solid state switch 240, a positive module terminal 250, and a negative module terminal 260.

Solid state driver 210 is connected to at least the gates of both the first solid state switch 230 and the second solid state switch 240. Solid state driver 210 is therefore able to drive both switches between their respective on and off positions. Further, the source of first solid state switch 230 is connected to the drain of second solid state switch 240. Additionally, both the source of first solid state switch 230 and the drain of second solid state switch 240 are connected to the positive module terminal 250. The drain of first solid state switch 230 is connected to the positive lead of cell stack array 220, and the source of second solid state switch 240 is connected to the negative lead of cell stack array 220 and negative module terminal 260.

Accordingly, when first solid state switch 230 is in an on-state and second solid state switch 240 is in an off-state, as controlled by solid state driver 210, cell stack array 220 of bypassable battery module 200 is engaged and connected through positive terminal module 250 and negative module terminal 260. In this case, bypassable battery module 200 is in the activated state.

Alternatively, when first solid state switch 230 is in an off-state and second solid state switch 240 is in an on-state, as controlled by solid state driver 210, cell stack array 220 of bypassable battery module 200 is effectively disengaged and bypassed by allowing positive terminal module 250 and negative module terminal 260 to be connected through second solid state switch 240 which is in an on-state. In this case, bypassable battery module 200 is in the bypassed state.

Bypassable battery module 200 is described in more detail in U.S. Pat. No. 9,525,290, which is incorporated by reference herein in its entirety.

The number and arrangement of components shown in FIG. 2 are provided as an example. In practice, bypassable battery module 200 may include additional components, fewer components, different components, or differently arranged components than those shown in FIG. 2. Additionally, or alternatively, a set of components (e.g., one or more components) of bypassable battery module 200 may perform one or more functions described as being performed by another set of components of bypassable battery module 200.

Figure 3:
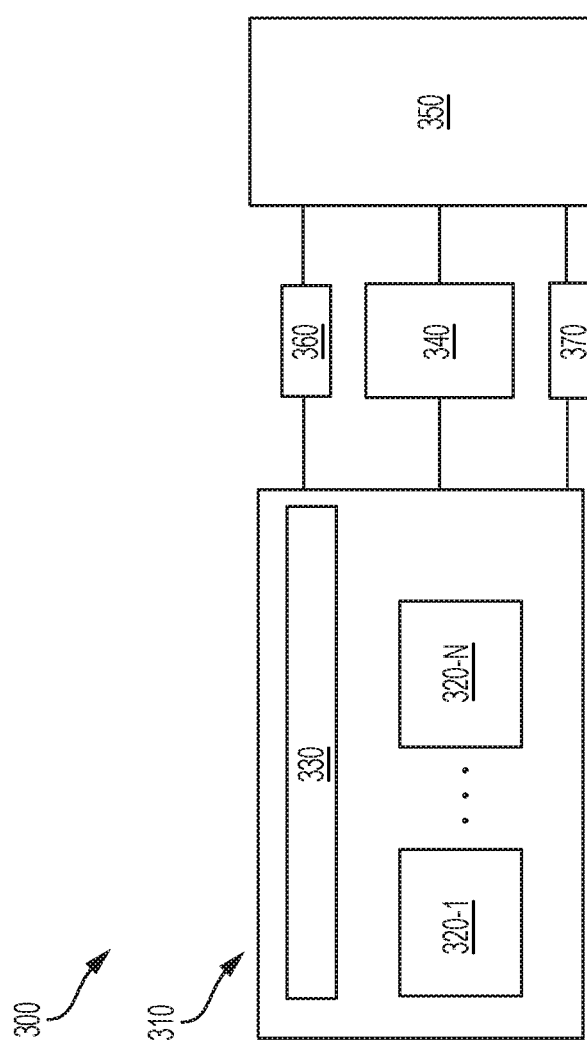
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a bypassable battery module system 310, a set of bypassable battery modules 320-1 through 320-N (N≥2), a processor 330, a precharge circuit 340, an application bus 350, a positive disconnect 360, and a negative disconnect 370.

Bypassable battery module system 310 includes a component that may selectively activate or bypass bypassable battery module 320-1 through bypassable battery module 320-N. Bypassable battery module system 310 and bypassable battery module 320 are described in more detail in association with U.S. Pat. No. 9,525,290. It should be understood, however, that implementations described herein are applicable to other types of systems and/or battery modules than as described in association with U.S. Pat. No. 9,525,290.

Processor 330 is implemented in hardware, firmware, or a combination of hardware and software. Processor 330 may include a processor (e.g., a central processing unit (CPU), an accelerated processing unit (APU), etc.), a microprocessor, a controller, a microcontroller, and/or any other type of processing component (e.g., a field-programmable gate array (FPGA), an application-specific integrated circuit (ASIC), etc.) that interprets and/or executes instructions.

In some implementations, processor 330 may include one or more processors capable of being programmed to perform a function. A memory, such as a random access memory (RAM), a read only memory (ROM), a flash memory, an optical memory, etc., may store information and/or instructions for use by processor 330. In some implementations, processor 330 may obtain information from one or more sensors (e.g., voltage sensors, current sensors, heat sensors, and/or the like), from a data structure, and/or the like, and perform one or more actions based on the obtained information. The one or more sensors may be associated with any of the components described in connection with FIG. 3.

Precharge circuit 340 includes a component capable of permitting current to pass between bypassable battery module system 310 and application bus 350. In some implementations, precharge circuit 340 includes a current-limiting component including a particular resistance value. For example, precharge circuit includes one or more components, such as a resistor, a connector, a transistor, a capacitor, a switch, and/or the like.

Application bus 350 includes a component capable of connecting a load to bypassable battery module system 310. In some implementations, application bus 350 includes a capacitive component. For example, application bus 350 includes one or more components, such as a capacitor, a transistor, a switch, a resistor, and/or the like. Positive disconnect 360 includes a component capable of permitting current to pass between bypassable battery module system 310 and application bus 350. Negative disconnect 370 includes a component capable of permitting current to pass between bypassable battery module system 310 and application bus 350.

The number and arrangement of components shown in FIG. 3 are provided as an example. In practice, environment 300 may include additional components, fewer components, different components, or differently arranged components than those shown in FIG. 3. Additionally, or alternatively, a set of components (e.g., one or more components) of environment 300 may perform one or more functions described as being performed by another set of components of environment 300.

Figure 4:
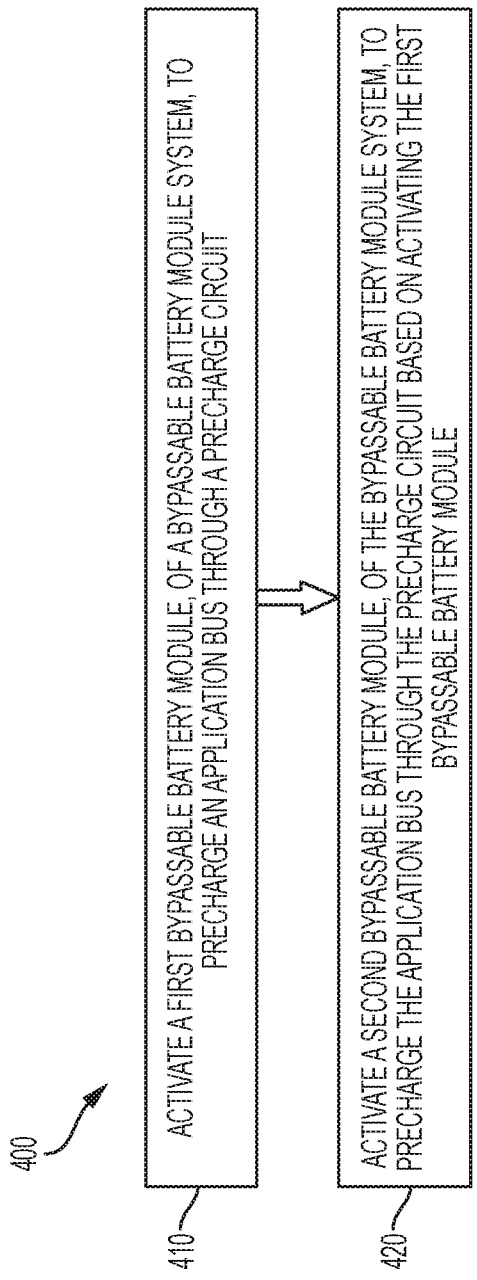
FIG. 4 is a flow chart of an example process for precharging an application bus by activating bypassable battery modules, of a bypassable battery module system, in a stepwise manner.

FIG. 4 is a flow chart of an example process 400 for precharging an application bus by activating bypassable battery modules, of a bypassable battery module system, in a stepwise manner. In some implementations, one or more process blocks of FIG. 4 may be performed by bypassable battery module system 310. For example, processor 330 of bypassable battery module system 310 may be configured to perform one or more functions associated with process blocks of FIG. 4. Alternatively, one or more functions of process blocks of FIG. 4 may be performed by another component or a group of components separate from or including bypassable battery module system 310, such as precharge circuit 340, application bus 350, positive disconnect 360, and/or negative disconnect 370.

As shown in FIG. 4, process 400 may include activating a first bypassable battery module, of a bypassable battery module system, to precharge an application bus through a precharge circuit (block 410). For example, bypassable battery module system 310 may activate a first bypassable battery module 320, of bypassable battery module system 310, to precharge application bus 350.

In some implementations, bypassable battery module system 310 may initiate a precharge process based on an input from another device (e.g., which may have received an input from a user), based on a time frame, based on being connected to application bus 350, and/or the like.

Bypassable battery module system 310 may open positive disconnect 360 and/or negative disconnect 370 to prevent current from passing between bypassable battery module system 310 and application bus 350 through positive disconnect 360 and/or negative disconnect 370. Additionally, bypassable battery module system 310 may close precharge circuit 340 to permit current to pass between bypassable battery module system 310 and application bus 350 through precharge circuit 340.

Initially, each bypassable battery module 320 of bypassable battery module system 310 may be in the bypassed state. As such, an output voltage of bypassable battery module system 310 may be 0V. Additionally, a voltage (e.g., an application bus voltage) of application bus 350 may be 0V. In this case, a voltage difference between an output voltage of bypassable battery module system 310 and a voltage of application bus 350 is 0V.

Bypassable battery module system 310 may activate a first bypassable battery module 320, of bypassable battery module system 310, to permit precharging of application bus 350 through precharge circuit 340. For example, the first bypassable battery module 320 may include a particular bypassable battery module 320 of bypassable battery module system 310. Additionally, or alternatively, bypassable battery module system 310 may activate a set of bypassable battery modules 320. For example, bypassable battery module system 310 may activate multiple bypassable battery modules 320 where the multiple bypassable battery modules 320 include a subset of bypassable battery modules 320 of bypassable battery module system 310. In other words, bypassable battery module system 310 may initially activate a single bypassable battery module 320 or a set of bypassable battery modules 320 to permit precharging of application bus 350.

The output voltage of bypassable battery module system 310 may be a voltage of the first bypassable battery module 320 based on the first bypassable battery module 320 being activated. For example, in the situation where a single bypassable battery module 320 is activated, the output voltage of bypassable battery module system 310 may correspond to a voltage of the single bypassable battery module 320 that is activated. Alternatively, in the situation where multiple bypassable battery modules 320 are activated, the output voltage of bypassable battery module system 310 may correspond to a sum of the voltages of the bypassable battery modules 320 that are activated.

A voltage difference between an output voltage of bypassable battery module system 310 and a voltage of application bus 350 may correspond to the voltage of the activated bypassable battery module(s) 320. In this case, current may flow from bypassable battery module system 310 to application bus 350 based on the voltage difference. The amount of current may depend on the voltage difference and a resistance value of precharge circuit 340.

A voltage of application bus 350 may increase based on the current that flows from bypassable battery module system 310 to application bus 350. For example, the current may charge capacitive components of application bus 350, thereby increasing a voltage of application bus 350. In this way, a voltage of application bus 350 may be substantially equal to an output voltage of bypassable battery module system 310 based on bypassable battery module(s) 320 being activated.

In this way, bypassable battery module system 310 may activate a second bypassable battery module 320, of bypassable battery module system 310, to permit further precharging of application bus 350 based on activating the first bypassable battery module 320, as described below.

As further shown in FIG. 4, process 400 may include activating a second bypassable battery module, of the bypassable battery module system, to precharge the application bus through the precharge circuit based on activating the first bypassable battery module (block 420). For example, bypassable battery module system 310 may activate a second bypassable battery module 320, of bypassable battery module system 310, to precharge application bus 350 based on activating the first bypassable battery module 320.

In some implementations, bypassable battery module system 310 may activate a second bypassable battery module 320 based on activating the first bypassable battery module 320. For example, bypassable battery module system 310 may activate single bypassable battery modules 320 in a stepwise manner. That is, bypassable battery module system 310 may activate a first bypassable battery module 320, may activate a second bypassable battery module 320, may activate a third bypassable battery module 320, etc. until each respective bypassable battery module 320 of bypassable battery module system 310 is activated.

Alternatively, bypassable battery module system 310 may activate multiple bypassable battery modules 320 in a stepwise manner. For example, bypassable battery module system 310 may activate a first subset of bypassable battery modules 320, may activate a second subset of bypassable battery modules 320, etc. until each respective bypassable battery module 320 of bypassable battery module system 310 is activated.

In some implementations, bypassable battery module system 310 may activate the second bypassable battery module 320 based on a condition. Bypassable battery module system 310 may obtain information from various sensors (e.g., voltage sensors, current sensors, and/or the like), from a data structure, and/or the like, and determine that a condition is satisfied based on the obtained information.

For example, bypassable battery module system 310 may activate the second bypassable battery module 320 based on a voltage difference between an output voltage of bypassable battery module system 310 and a voltage of application bus 350 satisfying a threshold. As an example, bypassable battery module system 310 may determine that the voltage difference is less than a threshold (e.g., 5V, 10V, 12V, etc.), and activate the second bypassable battery module 320 based on the voltage difference being less than the threshold.

Alternatively, bypassable battery module system 310 may activate the second bypassable battery module 320 based on a threshold amount of time having elapsed since the first bypassable battery module 320 was activated. For example, bypassable battery module system 310 may determine that a threshold amount of time (e.g., 5 milliseconds (ms), 10 ms, 25 ms, etc.) has elapsed since the first bypassable battery module 320 was activated, and activate the second bypassable battery module 320 based on the threshold amount of time having elapsed.

Alternatively, bypassable battery module system 310 may activate the second bypassable battery module 320 based on a current value satisfying a threshold. For example, bypassable battery module system 310 may determine that an amount of current flowing through precharge circuit 340 is less than a threshold (e.g., 2 A, 1.5 A, 1 A, etc.), and activate the second bypassable battery module 320 based on the amount of current being less than the threshold. Alternatively, bypassable battery module system 310 may use a current value obtained from another component of environment 300.

Alternatively, bypassable battery module system 310 may activate the second bypassable battery module 320 based on a voltage of application bus 350 satisfying a threshold. For example, bypassable battery module system 310 may determine that a voltage of application bus 350 is greater than a threshold, and activate the second bypassable battery module 320 based on the voltage being greater than the threshold. In some implementations, bypassable battery module system 310 may determine the threshold based on a number of bypassable battery modules 320 that are activated and/or voltages of the activated bypassable battery modules 320.

Alternatively, bypassable battery module system 310 may activate the second bypassable battery module 320 based on a power value satisfying a threshold. For example, bypassable battery module system 310 may determine a power value based on a current value and a resistance value of precharge circuit 340, and activate the second bypassable battery module 320 based on the power value being less than a threshold.

In some implementations, bypassable battery module system 310 may iteratively activate bypassable battery modules 320 of bypassable battery module system 310 until each respective bypassable battery module 320 of bypassable battery module system 310 is activated. By activating bypassable battery modules 320 in a stepwise manner, bypassable battery module system 310 reduces an amount of current that passes through precharge circuit 340, reduces power loss due to ohmic heating, permits a reduction in size of components of precharge circuit 340, reduces damage to precharge circuit 340, and/or the like.

Additionally, bypassable battery module system 310 may close positive disconnect 360 and negative disconnect 370 based on each bypassable battery module 320 (or a threshold number of bypassable battery modules 320) being activated to permit current to pass between bypassable battery module system 310 and application bus 350 through positive disconnect 360 and negative disconnect 370. Additionally, bypassable battery module system 310 may open precharge circuit 340 based on closing positive disconnect 360 and negative disconnect 370 to prevent current from passing through precharge circuit 340.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
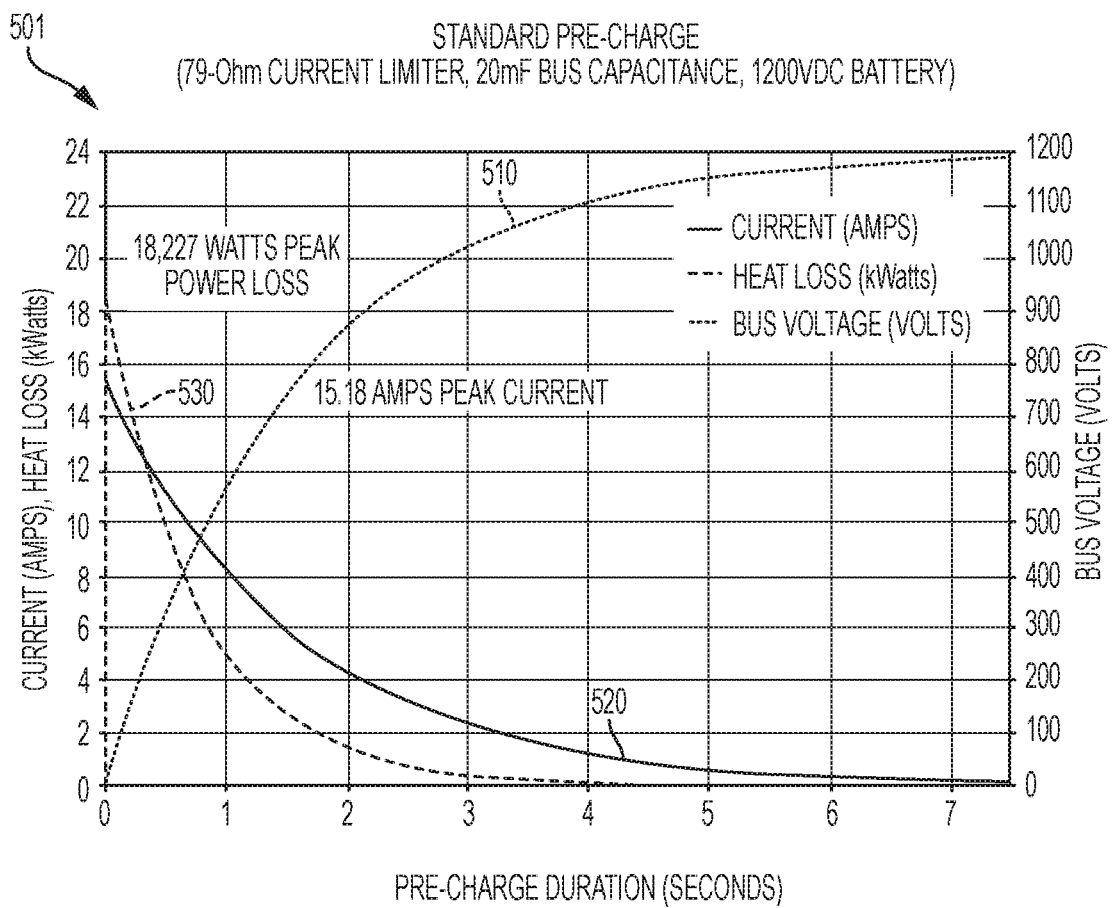
FIG. 5A is a diagram of an example graph depicting results of a precharge process that is performed by a power source in a non-stepwise manner and that is configured to be completed within a particular amount of time.

FIG. 5A is a diagram of an example graph 501 depicting results of a precharge process that is performed by a power source in a non-stepwise manner and that is configured to be completed within a particular amount of time.

The results shown in FIG. 5A were obtained using a system including a power source including a voltage of 1200V, a precharge circuit 340 including a resistance value of 79 Ohms, and an application bus 350 including a capacitance value of 20 mF. The system was configured to substantially complete the precharge process in a time frame of 6 seconds. Further, the entire voltage (i.e., 1200V) of the power source was introduced substantially instantaneously to application bus 350 through precharge circuit 340.

As shown in FIG. 5A, and by reference number 510, a voltage of application bus 350 increased from an initial value of 0V to substantially 1200V within the time frame of 6 seconds.

As further shown in FIG. 5A, and by reference number 520, a current value of precharge circuit 340 decreased from a peak current value of 15.18 A to substantially 0 A within the time frame of 6 seconds.

As further shown in FIG. 5A, and by reference number 530, a power loss value decreased from a peak power loss value of 18.227 kilowatts (kW) to 0 kW within the time frame of 6 seconds.

Figure 5B:
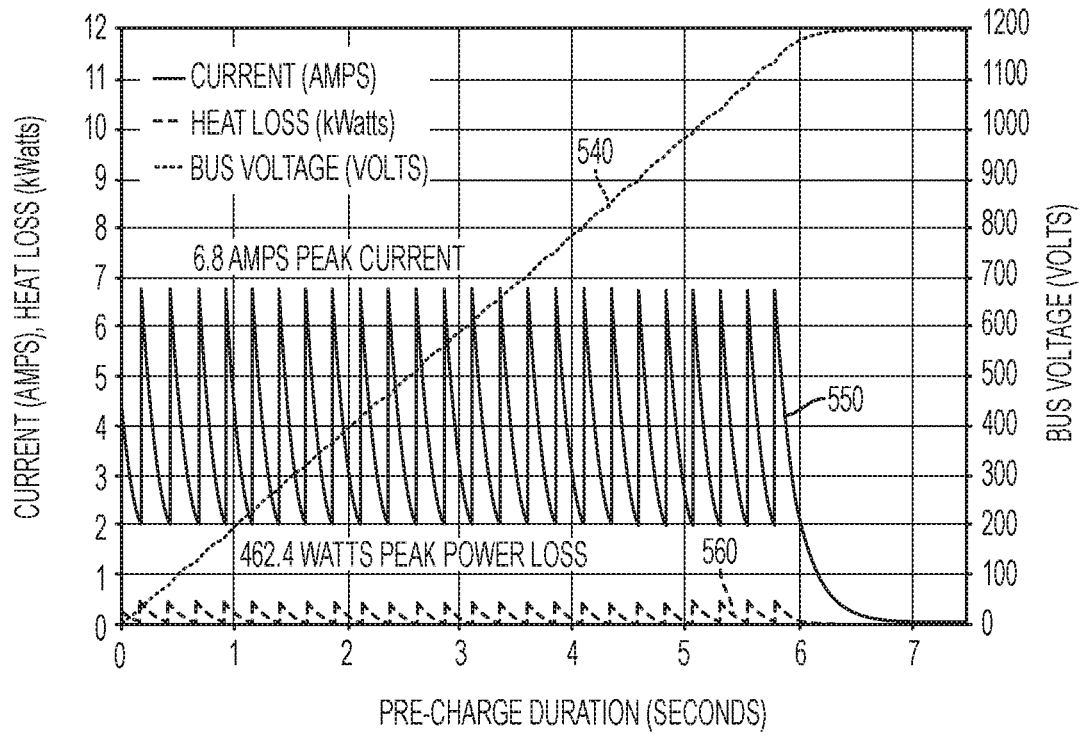
FIG. 5B is a diagram of an example graph depicting results of a precharge process that is performed by a bypassable battery module system in a stepwise manner and that is configured to be completed within a particular amount of time.

FIG. 5B is a diagram of an example graph 502 depicting results of a precharge process that is performed by a bypassable battery module system in a stepwise manner and that is configured to be completed within a particular amount of time.

The results shown in FIG. 5B were obtained using a bypassable battery module system 310 including a set of 24 bypassable battery modules 320 including respective voltages of 50V, a precharge circuit 340 including a resistance value of 10 Ohms, and an application bus 350 including a capacitance value of 20 mF. The bypassable battery module system 310 was configured to substantially complete the precharge process in a time frame of 6 seconds. Further, the total output voltage (i.e., 50V×24=1200V) of bypassable battery module system 310 was introduced in a stepwise manner to application bus 350.

As shown in FIG. 5B, and by reference number 540, a voltage of application bus 350 increased from an initial value of 0V to substantially 1200V within the time frame of 6 seconds.

As further shown in FIG. 5B, and by reference number 550, a current value of precharge circuit 340 fluctuated between a peak current value of 6.8 A and 2 A, and reduced to a value of 0 A within the time frame of 6 seconds. Each fluctuation between 6.8 A and 2 A corresponds to a respective activation of a particular bypassable battery module 320. As compared with the results of FIG. 5A, namely the peak current value of 15.18 A, the peak current value of 6.8 A yields a reduction in power loss and a reduction in generated heat.

As further shown in FIG. 5B, and by reference number 560, a peak power loss value of 426.4 W was obtained as compared to the 18 kW peak power loss value as shown in FIG. 5A. As such, some implementations described herein provided substantially 40 times less power loss than as compared to situations where a power source introduced a total output voltage substantially instantaneously to application bus 350. Additionally, some implementations described herein provided the foregoing benefits using a precharge circuit 340 including a resistance value nearly 8 times less than the resistance value of the precharge circuit 340 of the system of FIG. 5A (e.g., 10 Ohms versus 79 Ohms).

Figure 6A:
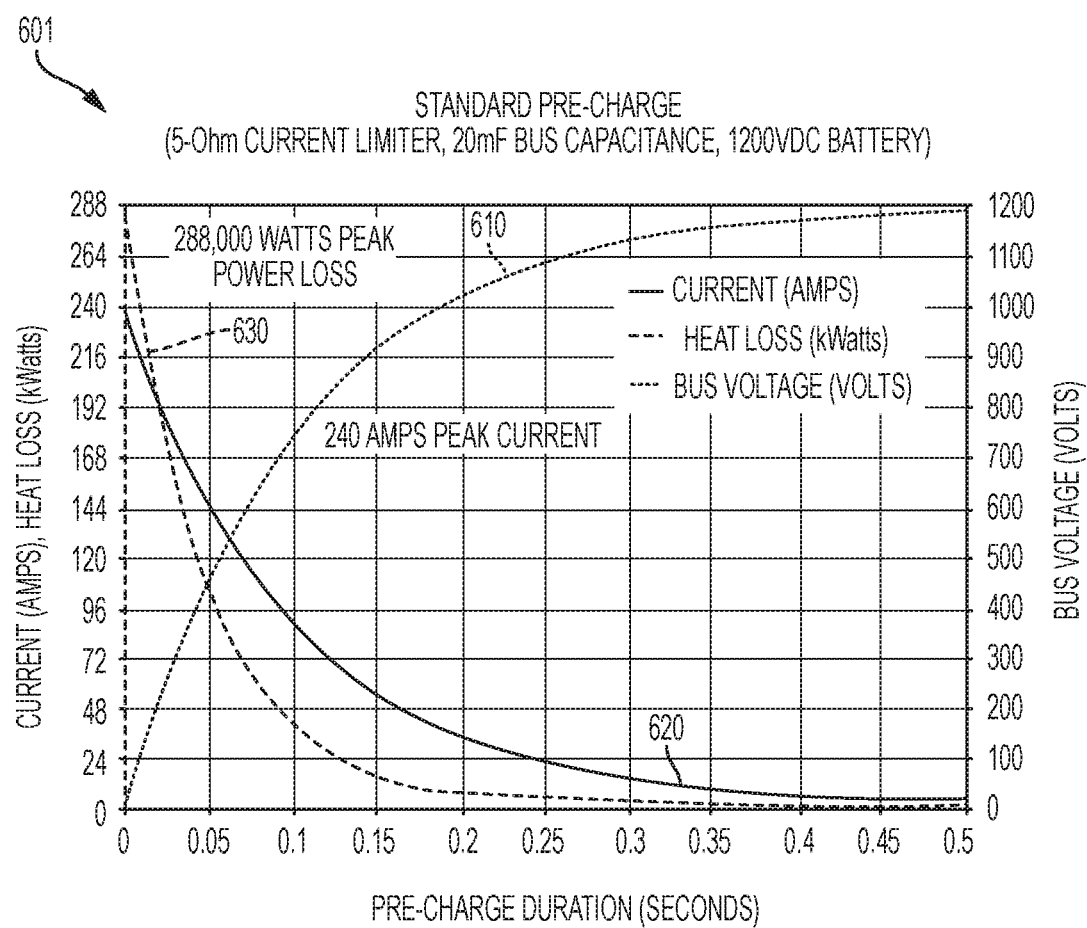
FIG. 6A is a diagram of an example graph depicting results of a precharge process that is performed by a power source in a non-stepwise manner and that is performed using a precharge circuit having a particular resistance value.

FIG. 6A is a diagram of an example graph 601 depicting results of a precharge process that is performed by a power source in a non-stepwise manner and that is performed using a precharge circuit having a particular resistance value.

The results shown in FIG. 6A were obtained using a system including a power source having a voltage of 1200V, a precharge circuit 340 including a resistance value of 5 Ohms, and an application bus 350 including a capacitance value of 20 mF. The total voltage (i.e., 1200V) of the power source was introduced substantially instantaneously to application bus 350 through precharge circuit 340.

As shown in FIG. 6A, and by reference number 610, a voltage of application bus 350 increased from an initial value of 0V to substantially 1200V in a time frame of 0.45 seconds.

As further shown in FIG. 6A, and by reference number 620, a current value of precharge circuit 340 decreased from a peak current value of substantially 240 A to 0 A within the time frame of 0.45 seconds.

As further shown in FIG. 6A, and by reference number 630, a power loss value decreased from a peak power loss value of 288 kW to 0 kW within the time frame of 0.45 seconds.

Figure 6B:
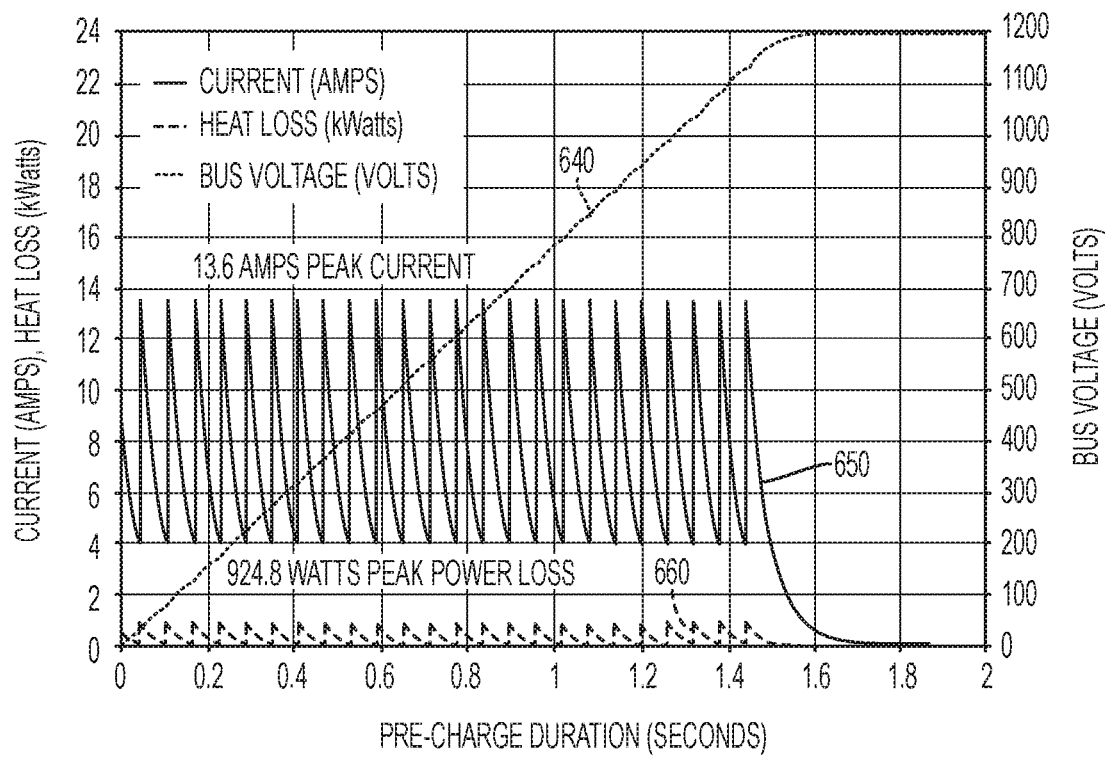
FIG. 6B is a diagram of an example graph depicting results of a precharge process that is performed by a bypassable battery module system in a stepwise manner and that is performed using a precharge circuit having a particular resistance value.

FIG. 6B is a diagram of an example graph depicting results of a precharge process that is performed by a bypassable battery module system in a stepwise manner and that is performed using a precharge circuit having the particular resistance value.

The results shown in FIG. 6B were obtained using bypassable battery module system 310 including a set of 24 bypassable battery modules 320 including respective voltages of 50V, a precharge circuit 340 including a resistance value of 5 Ohms, and an application bus 350 including a capacitance value of 20 mF. The total voltage (i.e., 50V× 24=1200V) of bypassable battery module system 310 was introduced in a stepwise manner to application bus 350.

As shown in FIG. 6B, and by reference number 640, a voltage of application bus 350 increased from an initial value of 0V to substantially 1200V within a time frame of 1.6 seconds.

As further shown in FIG. 6B, and by reference number 650, a current value of precharge circuit 340 fluctuated between a peak value of 13.6 A and 4 A, and reduced to 0 A within the time frame of 1.6 seconds. As compared to FIG. 6A, the peak current value of 13.6 A was nearly 18 times lower than the peak current value of 240 A as shown in FIG. 6A.

As further shown in FIG. 6B, and by reference number 660, a power loss value fluctuated between a peak power loss value of 0.924 kW and 0 kW within the time frame of 1.6 seconds. As compared to FIG. 6A, the peak power loss value of 0.924 kW is over 300 times less than the peak power loss value of 288 kW shown in FIG. 6A.

Figure 7:
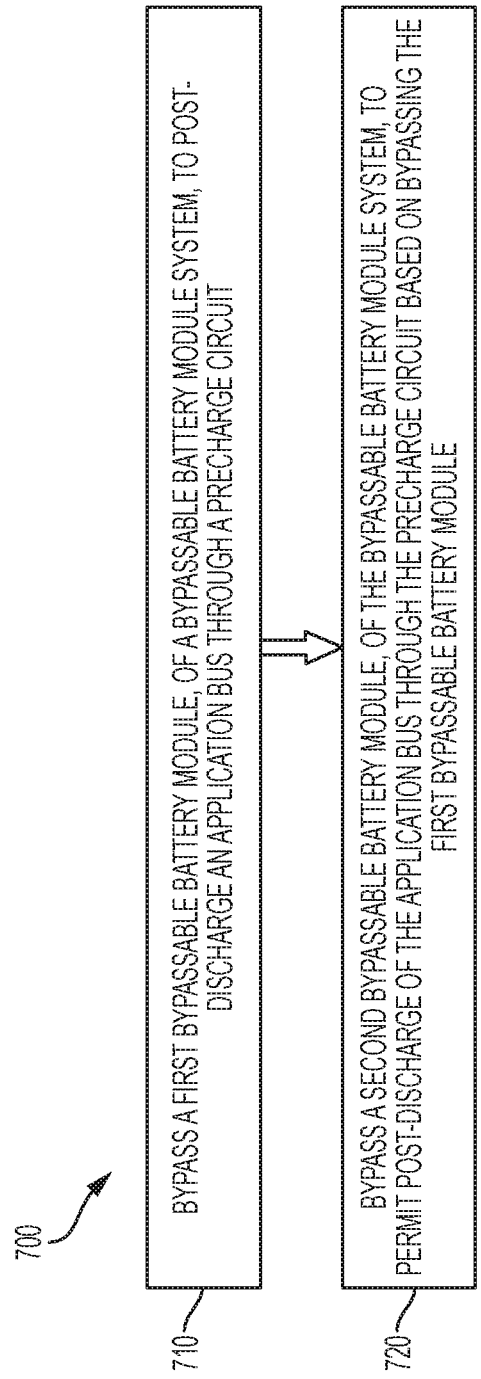
FIG. 7 is a flow chart of an example process for post-discharging an application bus by bypassing bypassable battery modules, of a bypassable battery module system, in a stepwise manner.

FIG. 7 is a flow chart of an example process 700 for post-discharging an application bus by bypassing bypassable battery modules, of a bypassable battery module system, in a stepwise manner. In some implementations, one or more process blocks of FIG. 7 may be performed by bypassable battery module system 310. For example, processor 330 of bypassable battery module system 310 may be configured to perform one or more functions of process blocks of FIG. 7. Alternatively, one or more functions of process blocks of FIG. 7 may be performed by another component or a group of components separate from or including bypassable battery module system 310, such as precharge circuit 340, application bus 350, positive disconnect 360, and/or negative disconnect 370.

As shown in FIG. 7, process 700 may include bypassing a first bypassable battery module, of a bypassable battery module system, to post-discharge an application bus through a precharge circuit (block 710). For example, bypassable battery module system 310 may bypass a first bypassable battery module 320, of bypassable battery module system 310, to post-discharge application bus 350 through precharge circuit 340.

In some implementations, bypassable battery module system 310 may initiate a post-discharge process based on an input from another device (e.g., which may have received an input from a user), based on a time frame, based on being connected to application bus 350 for a threshold amount of time, and/or the like.

Bypassable battery module system 310 may close precharge circuit 340 to permit current to pass between bypassable battery module system 310 and application bus 350 through precharge circuit 340. Additionally, bypassable battery module system 310 may open positive disconnect 360 and/or negative disconnect 370 to prevent current from passing between bypassable battery module system 310 and application bus 350 through positive disconnect 360 and/or negative disconnect 370.

Initially, each bypassable battery module 320 of bypassable battery module system 310 may be in the activated state. As such, an output voltage of bypassable battery module system 310 may be equal to the sum of the respective voltages of each bypassable battery module 320 that is in the activated state (e.g., a total voltage). Additionally, a voltage of application bus 350 may be equal to the output voltage of bypassable battery module system 310. In this case, a voltage difference between an output voltage of bypassable battery module system 310 and a voltage of application bus 350 is 0V.

Bypassable batter module system 310 may bypass a first bypassable battery module 320, of bypassable battery module system 310, to permit post-discharging of application bus 350 through precharge circuit 340. For example, the first bypassable battery module 320 may include a particular bypassable battery module 320 of bypassable battery module system 310. Additionally, or alternatively, bypassable battery module system 310 may bypass a set of bypassable battery modules 320. For example, bypassable battery module system 310 may bypass multiple bypassable battery modules 320 where the multiple bypassable battery modules 320 include a subset of bypassable battery modules 320 of bypassable battery module system 310. In other words, bypassable battery module system 310 may initially bypass a single bypassable battery module 320 or bypass a set of bypassable battery modules 320 to permit post-discharging of application bus 350.

The output voltage of bypassable battery module system 310 may be a total output voltage of bypassable battery module system 310 minus a voltage of the first bypassable battery module 320 based on the first bypassable battery module 320 being bypassed. In other words, the output voltage of bypassable battery module system 310 may be a sum of the respective voltages of the bypassable battery modules 320 that are in the active state. Alternatively, in the situation where multiple bypassable battery modules 320 are bypassed, then the output voltage of bypassable battery module system 310 may correspond to a total output voltage of bypassable battery module system 310 minus the sum of the voltages of bypassable battery modules 320 that are bypassed.

A voltage difference between an output voltage of bypassable battery module system 310 and a voltage of application bus 350 may correspond to the voltage of the bypassed battery module(s) 320. In this case, current may flow from application bus 350 to bypassable battery module system 310 based on the voltage difference. The amount of current may depend on the voltage difference and a resistance value of precharge circuit 340.

A voltage of application bus 350 may decrease based on the current that flows from application bus 350 to bypassable battery module system 310. For example, the current may discharge capacitive components of application bus 350, thereby decreasing a voltage of application bus 350. In this way, a voltage of application bus 350 may be reduced and may be substantially equal to an output voltage of bypassable battery module system 310 based on the first bypassable battery module(s) 320 being bypassed.

In this way, bypassable battery module system 310 may bypass a second bypassable battery module 320, of bypassable battery module system 310, to permit further post-discharging of application bus 350 through precharge circuit 340 based on bypassing the first bypassable battery module 320, as described below.

As further shown in FIG. 7, process 700 may include bypassing a second bypassable battery module, of the bypassable battery module system, to permit post-discharge of the application bus through the precharge circuit based on bypassing the first bypassable battery module (block 720). For example, bypassable battery module system 310 may bypass a second bypassable battery module 320, of bypassable battery module system 310, to permit post-discharge of application bus 350 through precharge circuit 340 based on bypassing the first bypassable battery module 320.

In some implementations, bypassable battery module system 310 may bypass a second bypassable battery module 320 based on bypassing the first bypassable battery module 320. For example, bypassable battery module system 310 may bypass single bypassable battery modules 320 in a stepwise manner. That is, bypassable battery module system 310 may bypass a first bypassable battery module 320, may bypass a second bypassable battery module 320, may bypass a third bypassable battery module 320, etc. until each respective bypassable battery module 320 of bypassable battery module system 310 is bypassed.

Alternatively, bypassable battery module system 310 may bypass multiple bypassable battery modules 320 in a stepwise manner. For example, bypassable battery module system 310 may bypass a first subset of bypassable battery modules 320, may bypass a second subset of bypassable battery modules 320, etc. until each respective bypassable battery module 320 of bypassable battery module system 310 is bypassed (or a threshold number of bypassable battery modules 320 are bypassed).

In some implementations, bypassable battery module system 310 may bypass a second bypassable battery module 320 (or a subset of bypassable battery modules 320) based on one or more conditions as described above in association with block 420 of FIG. 4. For example, bypassable battery module system 310 may bypass a second bypassable battery module 320 based on a voltage difference satisfying a threshold, based on a current value satisfying a threshold, based on a threshold amount of time having elapsed, and/or the like.

In some implementations, bypassable battery module system 310 may iteratively bypass bypassable battery modules 320 of bypassable battery module system 310 until each respective bypassable battery module 320 of bypassable battery module system is bypassed. By bypassing bypassable battery modules 320 in a stepwise manner, bypassable battery module system 310 reduces an amount of current that passes through precharge circuit 340, reduces power loss due to ohmic heating, prevents damage to system components, permits a reduction in size of components of precharge circuit 340, and/or the like.

Bypassable battery module system 310 may open precharge circuit 340 based bypassing each bypassable battery module 320 to prevent current from passing through precharge circuit 340.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
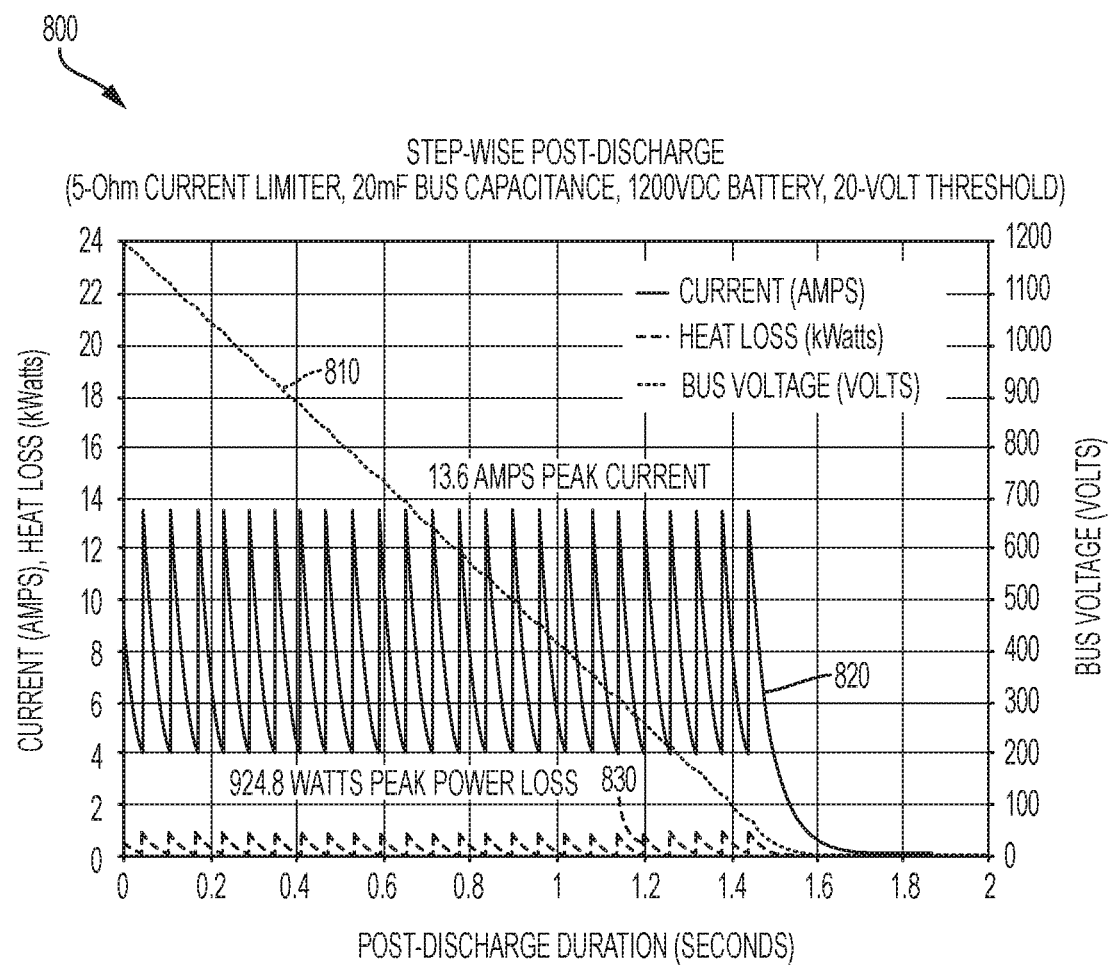
FIG. 8 is a diagram of an example graph depicting results of a post-discharge process that is performed by a bypassable battery module system in a stepwise manner.

FIG. 8 is a diagram of an example graph 800 depicting results of a post-discharge process that is performed by a bypassable battery module system in a stepwise manner.

The results shown in FIG. 8 were obtained using bypassable battery module system 310 including 24 bypassable battery modules 320 having respective voltages of 50V, a precharge circuit 340 including a resistance value of 5 Ohms, and an application bus 350 including a capacitance value of 20 mF. Bypassable battery module system 310 bypassed respective bypassable battery modules 320 in a stepwise manner.

As shown in FIG. 8, and by reference number 810, a voltage of application bus 350 decreased from an initial value and peak voltage of 1200V to 0V within a time frame of 1.6 seconds.

As further shown in FIG. 8, and by reference number 820, a current value of precharge circuit 340 fluctuated between a peak value of 13.6 A and 4 A within the time frame of 1.6 seconds. Each respective peak and trough corresponds to a particular bypassable battery module 320 being bypassed.

As further shown in FIG. 8, and by reference number 830, a power loss value fluctuated between a peak power loss value of 0.925 kW and 0 kW within the time frame of 1.6 seconds.

In this way, some implementations described herein improve precharge and post-discharge operations of battery systems by permitting stepwise precharge and/or post-discharge. Further, some implementations described herein reduce an amount of current that passes through precharge circuitry during such processes, thereby reducing an amount of power loss due to ohmic heating. Still further, some implementations described herein permit a reduction in size of components and/or permit a reduction in a number of components of precharge circuitry.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
activating a first bypassable battery module, of a bypassable battery module system, to precharge an application bus through a precharge circuit,
wherein a first voltage difference between a first output voltage of the bypassable battery module system and a first application bus voltage is less than a total voltage of the bypassable battery module system based on activating the first bypassable battery module of the bypassable battery module system; and
activating a second bypassable battery module, of the bypassable battery module system, to precharge the application bus through the precharge circuit based on activating the first bypassable battery module,
wherein a second voltage difference between a second output voltage of the bypassable battery module system and a second application bus voltage is less than the total voltage of the bypassable battery module system based on activating the second bypassable battery module.

2. The method of claim 1, further comprising:
determining that the first voltage difference between the first output voltage of the bypassable battery module system and the first application bus voltage is less than a threshold voltage difference; and
where activating the second bypassable battery module, of the bypassable battery module system, to precharge the application bus through the precharge circuit based on activating the first bypassable battery module comprises:
activating the second bypassable battery module, of the bypassable battery module system, to precharge the application bus through the precharge circuit based on activating the first bypassable battery module and based on determining that the first voltage difference between the first output voltage of the bypassable battery module system and the first application bus voltage is less than the threshold voltage difference.

3. The method of claim 1, further comprising:
determining that a threshold amount of time has elapsed based on activating the first bypassable battery module; and
where activating the second bypassable battery module, of the bypassable battery module system, to precharge the application bus through the precharge circuit based on activating the first bypassable battery module comprises:
activating the second bypassable battery module, of the bypassable battery module system, to precharge the application bus through the precharge circuit based on activating the first bypassable battery module and based on determining that the threshold amount of time has elapsed based on activating the first bypassable battery module.

4. The method of claim 1, further comprising:
activating each bypassable battery module of the bypassable battery module system, wherein a third output voltage of the bypassable battery module system is equal to the total voltage of the bypassable battery module system based on activating each bypassable battery module of the bypassable battery module system.

5. The method of claim 1, further comprising:
bypassing the second bypassable battery module, of the bypassable battery module system, to post-discharge the application bus through the precharge circuit based on activating the second bypassable battery module.

6. The method of claim 1, further comprising:
determining that a condition is satisfied based on activating the first bypassable battery module; and
where activating the second bypassable battery module, of the bypassable battery module system, to precharge the application bus through the precharge circuit based on activating the first bypassable battery module comprises:
activating the second bypassable battery module, of the bypassable battery module system, to precharge the application bus through the precharge circuit based on activating the first bypassable battery module and based on determining that the condition is satisfied.

7. The method of claim 1, wherein the first voltage difference is equal to a voltage of the first bypassable battery module.

8. A system, comprising:
a first battery module configured to activate to precharge an application bus through a precharge circuit,
wherein a first voltage difference between a first output voltage of the system and a first application bus voltage is less than a total voltage of the system based on the first battery module being activated; and
a second battery module configured to activate to precharge the application bus through the precharge circuit after the first battery module is activated,
wherein a second voltage difference between a second output voltage of the system and a second application bus voltage is less than the total voltage of the system based on the second battery module being activated.

9. The system of claim 8, wherein the second battery module is configured to activate based on the first voltage difference between the first output voltage of the system and the first application bus voltage being less than a threshold voltage difference.

10. The system of claim 8, wherein the second battery module is configured to activate based on a threshold amount of time having elapsed after the first battery module is activated.

11. The system of claim 8, wherein a third output voltage of the system is equal to the total voltage of the system based on each battery module of the system being activated.

12. The system of claim 8, wherein the second battery module is configured to enter a bypassed state to permit a post-discharge of the application bus.

13. The system of claim 8, wherein the first voltage difference is equal to a voltage of the first battery module.

14. The system of claim 8, wherein the second battery module is configured to activate based on a condition being satisfied.

15. A device, comprising:
one or more processors to:
activate a first bypassable battery module, of a bypassable battery module system, to precharge an application bus through a precharge circuit,
wherein a first voltage difference between a first output voltage of the bypassable battery module system and a first application bus voltage is less than a total voltage of the bypassable battery module system; and
activate a second bypassable battery module, of the bypassable battery module system, to precharge the application bus through the precharge circuit based on activating the first bypassable battery module,
wherein a second voltage difference between a second output voltage of the bypassable battery module system and a second application bus voltage is less than the total voltage of the bypassable battery module system based on activating the second bypassable battery module.

16. The device of claim 15, where the one or more processors are further to:
determine that the first voltage difference between the first output voltage of the bypassable battery module system and the first application bus voltage is less than a threshold voltage difference; and
where the one or more processors, when activating the second bypassable battery module, are to:
activate the second bypassable battery module based on determining that the first voltage difference between the first output voltage and the first application bus voltage is less than the threshold voltage difference.

17. The device of claim 15, where the one or more processors are further to:
determine that a threshold amount of time has elapsed based on the first bypassable battery module being activated; and
where the one or more processors, when activating the second bypassable battery module, are to:
activate the second bypassable battery module based on determining that the threshold amount of time has elapsed.

18. The device of claim 15, where the one or more processors are further to:
activate each bypassable battery module of the bypassable battery module system,
wherein a third output voltage of the bypassable battery module system is equal to the total voltage of the bypassable battery module system based on activating each bypassable battery module of the bypassable battery module system.

19. The device of claim 15, where the one or more processors are further to:
determine that a condition is satisfied based on activating the first bypassable battery module; and
where the one or more processors are further to:
activate the second bypassable battery module based on determining that the condition is satisfied.

20. The device of claim 15, where the one or more processors are further to:
bypass the first bypassable battery module and the second bypassable battery module in a stepwise manner to permit post-discharge of the application bus.

* * * * *